July 19, 1955 M. K. BABAIAN 2,713,406
BIDIRECTIONAL OVERLOAD RELEASE CLUTCHES
Original Filed Nov. 18, 1952 2 Sheets-Sheet 1
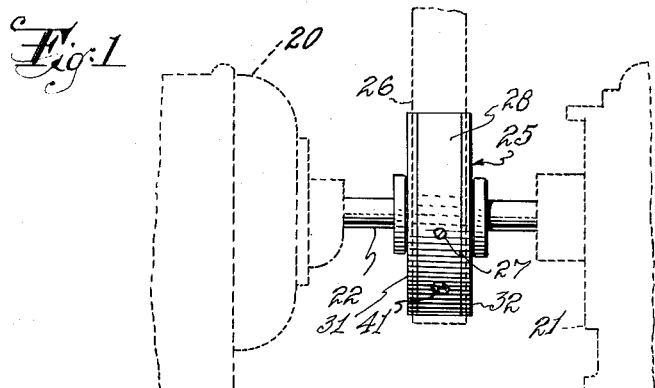
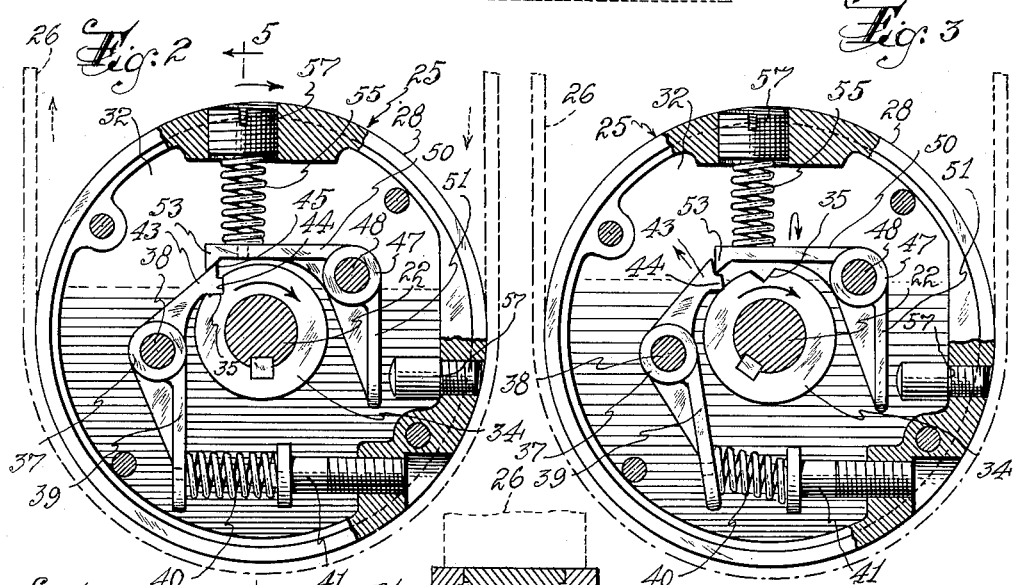
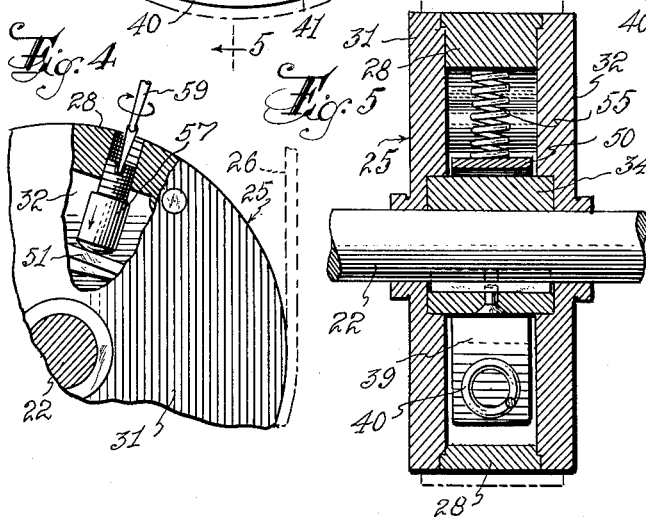
Inventor:
Mesrop K. Babaian
BY Roy Griffith Jones
Attorney.

July 19, 1955     M. K. BABAIAN     2,713,406
BIDIRECTIONAL OVERLOAD RELEASE CLUTCHES
Original Filed Nov. 18, 1952

INVENTOR
MESROP K. BABAIAN

BY *Howson & Howson,*
ATTORNEYS.

United States Patent Office 2,713,406
Patented July 19, 1955

2,713,406

BIDIRECTIONAL OVERLOAD RELEASE CLUTCHES

Mesrop K. Babaian, Irvington, N. J., assignor, by mesne assignments, to Centric Clutch Company, a corporation of New Jersey Original application November 18, 1952, Serial No. 321,147. Divided and this application July 6, 1953, Serial No. 366,235

5 Claims. (Cl. 192—56)

This invention relates to automatic overload release clutches, and is a division of my copending application entitled Overload Release Clutches, Serial #321,147, filed November 18, 1952.

One of the features of my present invention is the provision of means, in a clutch of the character described, whereby the clutch automatically releases on overload regardless of whether it rotates in the clockwise or counter-clockwise direction and without the necessity of rearranging any part of the clutch.

Another feature of the invention is the provision of means enabling a clutch of given size to carry a heavier load, whereby a smaller and therefore less expensive clutch may be employed for a given load. A further feature lies in the provision of a switch which automatically operates to shut off a power source, as an electric motor for example, when an overload occurs.

Other features will be apparent to those skilled in the art from a reading of the following disclosure.

Referring to the drawings for a detailed description of the invention.

Fig. 1 is an elevational view of a clutch mounted on a shaft and driving a belt, the shaft connecting a motor and a speed reducer.

Fig. 2 is a view partly in section, and partly in interior elevation, of one form of clutch, showing the clutch elements in operative or driving position;

Fig. 3 is a view similar to that of Fig. 2 but shows the clutch elements in released or declutched position;

Fig. 4 is a fragmentary view of the clutch, partly in section, showing the setting of a clutch reset means by a turning instrument;

Fig. 5 is a vertical section taken on line 5—5 of Fig. 2;

Fig. 6 is a side elevation of a collar which is adapted to be secured to a shaft and which forms part of the clutch;

Figure 7:
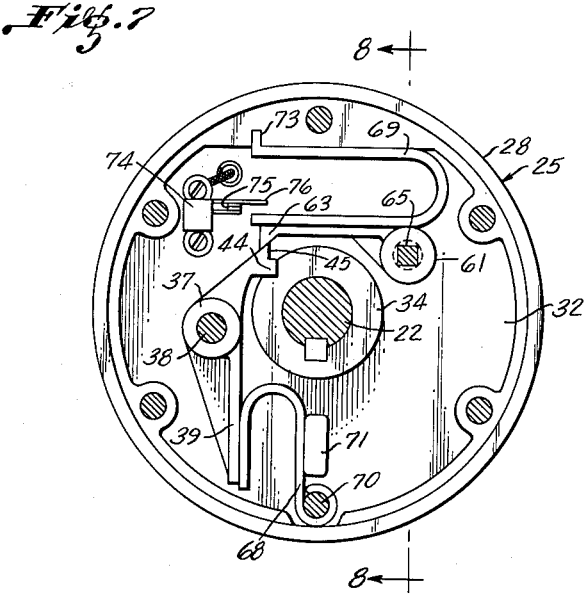
Fig. 7 shows an alternate form of the invention in interior elevation.

In more detail Fig. 1 shows an electric motor 20 driving a speed reducer 21 through a shaft 22. An overload release clutch 25 mounted on said shaft is keyed thereto and acts also as a pulley to drive a belt 26. It is to be understood that the periphery of the clutch may be provided with a sprocket for a chain drive, or with toothed gear.

The clutch comprises a casing which is made up of a circular body 28 and side covers 31 and 32. Said circular body has inwardly extending fastening lugs for the covers and inwardly extending bosses or thickened parts to support certain elements hereinafter either described or obvious.

A collar 34 is keyed to shaft 22 within the casing as shown in Fig. 5, said collar being shown by itself in Fig. 6. It is seen that a V-shaped notch 35 is formed in the periphery of the collar. The apex of the notch is on a radius of the collar and its sides are at equal angles from said radius. The importance of having the notch V-shaped is that it allows the clutch to drive and release when running in either the clockwise or counterclockwise direction. Such a notch is in contrast to, and has the important advantage noted over, the L-shaped notch formerly used in certain overload release clutches, the latter being operative only in one direction, unless the positions of certain elements of the clutch are changed.

As shown in Figs. 2 and 3, a pawl 37 turns on a pivot 38 which extends from a side of the casing. Said pawl has a lower arm 39 against which presses one end of a compressed coiled load or load-resisting, spring 40. Said spring at its other end presses against a set screw 41 which is supported in said circular body, and this screw is used to regulate the compression of said spring. Said pawl has an upper arm 43, the end of which is formed to provide a V-shaped detent 44 adapted to fit into notch 35, and an L-shaped notch 45 above or outside of, said detent, and adjacent thereto. The coil 40 normally holds detent 44 in notch 35. The clutch also comprises a second pawl 47, this pawl turning on pivot 48 which is formed on a side of the casing. The second pawl 47 comprises a substantially horizontal arm 50 and a substantially vertical arm 51. The horizontal arm is formed at its free end into a downwardly extending angular detent 53, adapted to fit into L-shaped notch 45 of first pawl 37 under overload condition. A second compressed coiled load, or load-resisting, spring 55 presses against and is held to horizontal arm 50 to normally hold the latter under pressure against the free end of arm 43 of first pawl 37, i. e. when detent 44 of the latter pawl is engaged in notch 35 of the collar 34. Said coil 55 bears against, and sets into, set screw 57 at its other end, said latter screw being threaded into an opening in said circular body of the clutch and adapted to regulate the compression of spring 55.

When the shaft 22 turns in either direction under normal loads, pawl 37, its detent 44 fitting into notch 35, is locked to the shaft due to pressure of the load springs 40 and 55, and the whole clutch is therefore also locked to the shaft. When, however, an overload occurs, said detent 44 is forced out of said notch against the pressure of said springs, as shown in Fig. 3. Thereupon, detent 53 of pawl 47 is forced by spring 55 into L-shaped notch 45 of first pawl 37, to keep the latter in locked out position, as also shown in Fig. 3. The cause of the overload having been removed, pawl 47 is taken out of notch 45, i. e., reset to its normal position, by turning a reset screw 57, which threadedly engages said circular body, against the vertical arm 51 of second pawl or reset lever 47, said reset screw being seen to be at right angles to said vertical arm and reset by instrument 59 shown in Fig. 4. Detent 44 will then fall into notch 35 when the two are brought into registration, as by turning either the shaft or the clutch thru part of one revolution. It is to be noted that pawl 47 has a triple function, viz., to exert, through spring 55, pressure on pawl 47, to lock out the latter on overload, and to reset the same after removal of the overload. Incidentally collar 34 and pawls 37 and 47 are made of case hardened steel in order to reduce wear and friction.

It is to be pointed out that the provision of two load springs, viz., coils 40 and 55, instead of one as previously used, and in the positions and with the functions indicated, is one of the features of the invention, as thereby a heavier load may be carried by a a clutch of given diameter and weight, and greater safety is secured in case of failure of one load coil.

Figure 8:
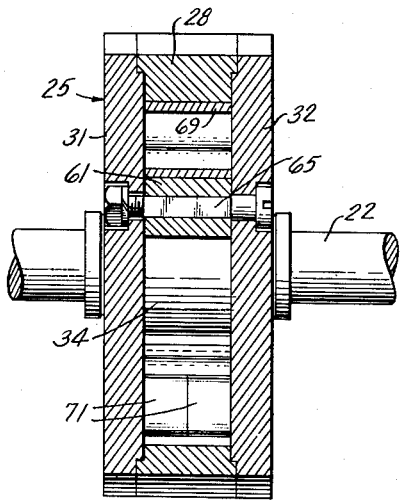
Fig. 8 is a vertical section on line 8—8 of Fig. 7.

Referring now to Figs. 7 and 8, these show a modified form of clutch in which the casing is essentially the same as that previously described, and its corresponding parts are indicated by the same numerals. The shaft 22, collar 34 and pawl 37 are also similar in form and function to the corresponding parts of the form previously described and bear the same numerals. The pawl 61 of the present form is substituted for pawl 47 of the previous form; it is similar to the latter except that it does not have a vertical arm corresponding to arm 51 of the first described form. The detent 63 of the present form corresponds to detent 53 of the previous form in shape and function.

In the present form, pawl 61, which acts as a reset lever as one of its functions, may be raised out of notch 45 by turning a square pin 65 which extends from said pawl through one side of the casing, whereby the vertical arm 51 of pawl 47 is eliminated. The present pawl is therefore simpler and the means 65 for moving pawl 61 has the advantage of being readily accessible due to its being at the side of the clutch, in contrast to reset screw 57 of the previous forms, which may at times be under belt 26. In the present form of clutch, U-shaped load springs 68 and 69 are substituted for coil springs 40 and 55 respectively and have the same functions as those coiled springs. Coil 68 is bent at one end around a stub 70 with one of its arms bearing against a block 71 and its other arm bearing against arm 39 of pawl 37. Spring 69 has one of its arms bearing against pawl 61 and its other arm against a part of the circular body of the casing, the free end of the latter arm being bent and inserted into a slot of the casing, as at 73. The U-shaped springs are intended more for lighter loads, although they may be used for heavy loads, but for the latter, similar springs of heavier material are substituted for the lighter springs. The functioning of this clutch is similar to that of the first form and therefore need not be explained.

The present form of the invention shows a means for automatically cutting off the power from a motor on overload, said means being illustrated as a snap switch 74 within the casing, and having a pair of contacts 75 which are opened on overload by the lower arm of spring 69 when said arm is raised on overload against an arm 76 of the upper contact, which arm extends beyond the upper of said contacts. By putting the switch in a motor supply circuit, the motor is shut down by opening the switch.

What is claimed is:

1. An overload release clutch of the character described, comprising a casing, a circular collar adapted to be secured to a shaft and having a V-shaped notch formed in its periphery, a first pawl and a seond pawl pivotally mounted in said casing, said first pawl having two arms angularly joined at a pivot point and being pivotally mounted on said casing at said pivot point, one of said arms having a detent and a notch, said detent being adapted to fit said collar notch and normally disposed therein, but adapted to slip out of said collar notch on overload, a first spring bearing against the other arm of said first pawl and normally holding the detent of said first pawl in said notch, a second spring normally pressing said second pawl against said first pawl, both of said springs being load springs adapted to resist the tendency of a normal load to remove said detent from said collar notch, said second pawl being pressed by its spring into said notch of said first pawl when the latter is moved out of said collar notch by an overload, thereby preventing said first pawl from reentering said notch until the overload is removed.

2. An overload release clutch of the character described, comprising a casing, a collar adapted to be secured to a shaft and having a notch with oppositely inclined sides formed in its periphery, a first pawl and a second pawl pivotally mounted in said casing, said first pawl having two arms angularly joined at a pivot point and being pivotally mounted on said casing at said pivot point, one of said arms having a detent and a notch, said detent being adapted to fit said collar notch and normally disposed therein, but adapted to slip out of said collar notch on overload, a first spring bearing against the other arm of said first pawl and normally holding the detent of said first pawl in said notch, a second spring normally pressing said second pawl against said first pawl, both of said springs being load springs adapted to resist the tendency of a normal load to remove said detent from said collar notch, said second pawl being pressed by its spring into said notch of said first pawl when the latter is moved out of said collar notch by an overload, thereby preventing said first pawl from reentering said notch until the overload is removed.

3. An overload release clutch of the character described, comprising a casing, a collar adapted to be secured to a shaft and having a notch formed in its periphery, a first pawl and a second pawl pivotally mounted in said casing, said first pawl having two arms angularly joined at a pivot point and being pivotally mounted on said casing at said pivot point, one of said arms having a detent and a notch, said detent being adapted to fit said collar notch and normally disposed therein, but adapted to slip out of said collar notch on overload, a first spring bearing against the other arm of said first pawl and normally holding the detent of said first pawl in said collar notch, a second spring normally pressing said second pawl against said first pawl, both of said springs being load springs adapted to resist the tendency of a normal load to remove said detent from said collar notch, said second pawl being pressed by its spring into said notch of said first pawl when the latter is moved out of said collar notch by an overload, thereby preventing said first pawl from reentering said notch until the overload is removed.

4. The overload release clutch claimed in claim 3 and including means for disengaging said second pawl from said first pawl.

5. An overload release clutch of the character described comprising a casing, a collar adapted to be secured to a shaft and having a notch formed in its periphery, a first pawl and a second pawl pivotally mounted in said casing, said first pawl having two arms angularly joined at a pivot point and being pivotally mounted on said casing at said pivot point, one of said arms having a detent and a notch, said detent being adapted to fit said collar notch and normally disposed therein, but adapted to slip out of said collar notch on overload, a first spring bearing against the other arm of said first pawl and normally holding the detent of said first pawl in said collar notch, a second spring normally pressing said second pawl against said first pawl, both of said springs being load springs adapted to resist the tendency of a normal load to remove said detent from said collar notch, said second pawl being pressed by its spring into said notch of said first pawl when the latter is moved out of said collar notch by an overload, thereby preventing said first pawl from reentering said notch until the overload is removed, and an electric switch within said casing adapted to be opened by said second spring when said first pawl is disengaged from said collar notch.

References Cited in the file of this patent

UNITED STATES PATENTS

| | | |
|---|---|---|
| 1,158,354 | Willis | Oct. 26, 1915 |
| 1,548,427 | Aldeen | Aug. 4, 1925 |
| 1,705,047 | Ermold | Mar. 12, 1929 |
| 1,745,738 | Carter | Feb. 4, 1930 |
| 1,858,074 | Damerell | May 10, 1932 |
| 2,003,115 | Grohn | May 28, 1935 |
| 2,256,781 | Nelson | Sept. 23, 1941 |